United States Patent

Herndon

[15] 3,662,102

[45] May 9, 1972

[54] BI-DIRECTIONAL TELEVISION SCAN SYSTEM

[72] Inventor: John W. Herndon, Orlando, Fla.

[73] Assignee: The United States of America as represented by the Secretary of the Navy

[22] Filed: Sept. 15, 1970

[21] Appl. No.: 72,290

[52] U.S. Cl. ..............................178/7.7, 178/7.5 R, 315/24

[51] Int. Cl. ..............................H04n 3/16

[58] Field of Search ..............................315/19, 24; 178/7.5 R, 7.7; 307/227, 261; 328/128

[56] References Cited

UNITED STATES PATENTS

| | | | |
|---|---|---|---|
| 3,176,137 | 3/1965 | Hofmann et al. | 315/24 |
| 3,150,271 | 9/1964 | Robertson | 307/227 |
| 3,340,476 | 9/1967 | Thomas et al. | 307/261 |
| 2,237,651 | 4/1941 | Bruche | 178/7.7 |
| 2,825,754 | 3/1958 | Toulon | 178/7.7 |
| 3,418,519 | 12/1968 | Ferrier, Jr. et al. | 315/24 |
| 3,349,257 | 10/1957 | Thomas et al. | 307/261 |
| 3,105,158 | 9/1963 | Nichols | 307/227 |
| 3,541,246 | 11/1970 | Goldfischer | 178/DIG. 21 |

*Primary Examiner*—Robert L. Griffin
*Assistant Examiner*—George G. Stellar
*Attorney*—Richard S. Sciascia, John W. Pease and Harvey A. David

[57] ABSTRACT

A television scansion system generates symmetrical triangular waveform horizontal deflection signals and linear ramp stairstep vertical deflection signals. The raster produced by these deflection signals is characterized as bi-directional horizontal scanning with vertical steps at alternate ends of the scans.

1 Claim, 6 Drawing Figures

John W. Herndon
INVENTOR
By Harvey A. David
John M. Pease
Attorneys

John W. Herndon
INVENTOR

By Harvey A. David
John M. Pease

Attorneys

John W. Herndon
INVENTOR

By Harvey A. David
John M. Pease

Attorneys

John W. Herndon
INVENTOR
By Harvey A. David
John M. Pease
Attorneys

BI-DIRECTIONAL TELEVISION SCAN SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to television and more particularly to improvements in scansion in a television system.

New applications of television systems, such as in training devices having visual simulation, frequently demand a higher quality of resolution and linearity than are readily attainable with conventional television scan techniques and with given bandwidth limitations.

The conventional television system, such as is used for commercial broadcasting, generates the scanning raster by moving the electron spot across the raster area and downward simultaneously by the application of horizontal deflection forces (normally top to bottom). The resultant scan line path is a line with a negative slope. At the end of the active portion of the line the spot is blanked during which time the spot is returned to the opposite side of the raster area, then unblanked for the next active scan line. The blanking is necessary to remove the retrace line from the displayed raster. Since horizontal resolution is proportional to the length of the active sweep time, the greater the utilization of the horizontal line period for active picture producing, the greater the resultant resolution. The significant length of the blanking period reduces the active time and therefore reduces horizontal resolution.

SUMMARY OF THE INVENTION

With the foregoing in mind, it is a principal object of this invention to provide a means for television scanning that will yield higher resolution and linearity than will the conventional commercial television system under given conditions of bandwidth capability, or equal resolution and better linearity with reduced bandwidth.

Another object of this invention is to improve resolution and linearity in a television system through the provision of sweep circuitry which effects increased active scan time per scan line.

As another object this invention aims to accomplish the foregoing by separating the sweep function into two independent forces, one acting during the active line period and the other at the end of the line.

Still another object of the invention is to provide an arrangement of sweep apparatus to produce, in one example, bidirectional horizontal active television scan lines for camera and display tubes, and to produce vertical deflection forces to advance the generation of a television raster by means of a step function of voltage or current at the end of each horizontal scan line. The resulting scan then may be characterized in that example as horizontally across in a first direction, then a step down at the end of the line, then horizontally across in the other direction, and then another step down at the end of that line preparatory to the next horizontal line in the first direction.

The invention may be further said to reside in certain novel combinations and arrangements of parts whereby the foregoing objects and advantages are achieved, as well as others which will become apparent from the following description of a presently preferred embodiment when read in conjunction with the accompanying sheets of drawings.

DESCRIPTION OF THE PREFERRED EMBODIMENT

Figure 1:
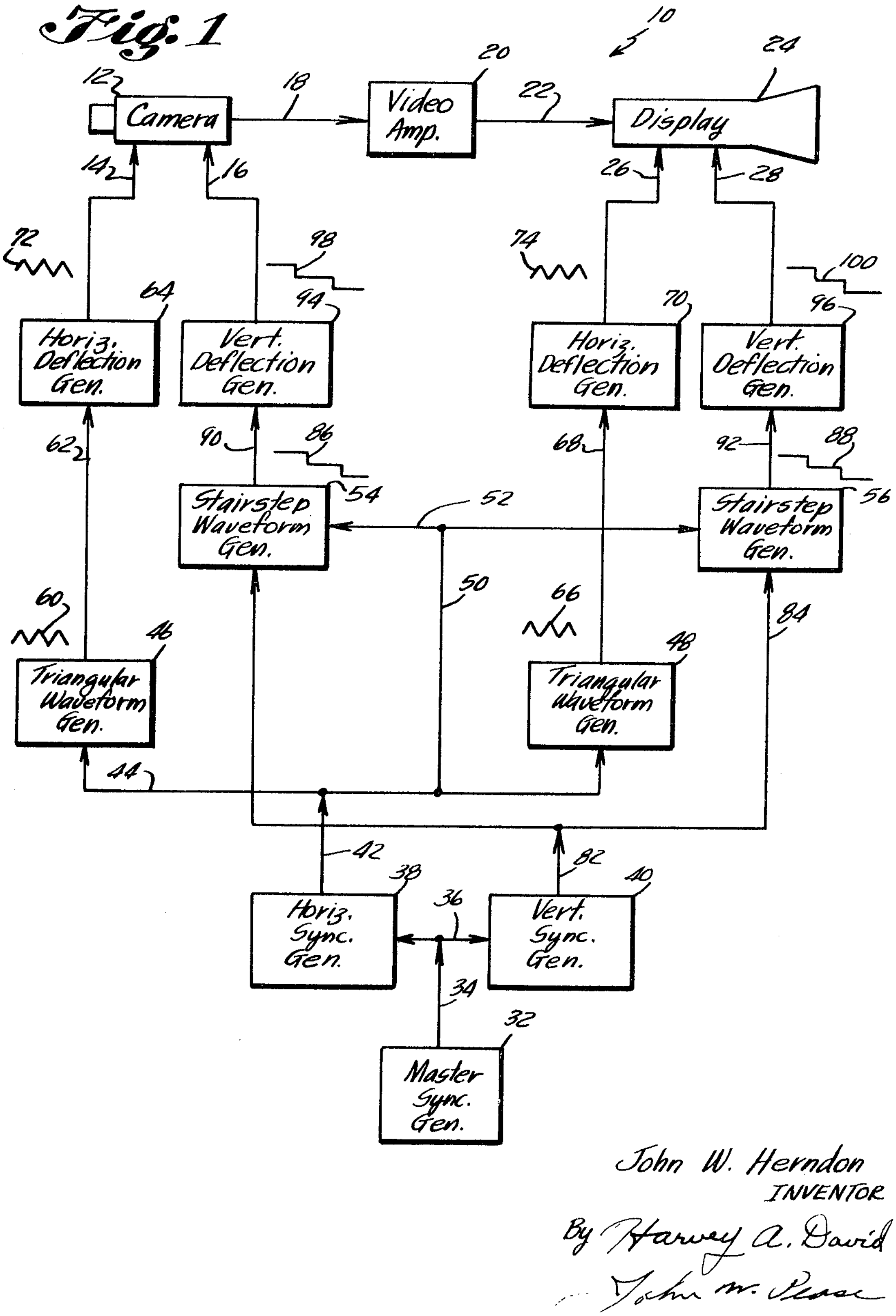
FIG. 1 is a schematic illustration, in block form, of a television system embodying the improved scanning circuitry of this invention.

Referring now to FIG. 1 a closed circuit T.V. system 10 embodying the invention comprises a conventional television camera 12 of the type which is responsive to horizontal and vertical deflection voltages or current inputs represented by lines 14, 16 to render a video output signal as represented by line 18. The signal on line 18 is amplified by a video amplifier 20 and applied as shown by line 22 as the video input to a cathode ray tube type of display means 24. The display means 24 is responsive to horizontal and vertical deflection voltage or current inputs via lines 26, 28 to produce a display picture corresponding to the view of the camera. Of course, the horizontal and vertical deflection inputs via lines 14 and 16 are suitably synchronized with those via lines 26, 28.

In accordance with the present invention the system 10 comprises a master sync generator 32 which feeds sync pulses via lines 34, 36 to a horizontal sync generator 38 and a vertical sync amplifier 40. The horizontal sync generator 38 has its output connected as shown via lines 42, 44 to triangular waveform generators 46 and 48, and further via lines 50, 52 to stairstep waveform generators 54 and 56.

The triangular waveform generator 46 provides an output waveform 60, via line 62, to a horizontal deflection voltage or current generator 64, the output of which is represented by the mentioned line 14 to the camera 12. Similarly, the triangular waveform generator 48 provides an output waveform 66, via line 68, to a horizontal deflection voltage or current generator 70, the output of which is represented by the mentioned line 26 to the display means 24. The outputs of the generators 64 and 70 are, of course, in the form of triangular waveforms 72 and 74 corresponding to the waveforms 60 and 66, respectively.

The vertical sync generator 40 provides step sync signals and has its output connected as shown via lines 82, 84 to stairstep waveform generators 54 and 56. The stairstep waveform generators 54 and 56 are responsive to the output of the horizontal sync generator 38 and to the step sync output of the vertical sync generator 40 to provide stairstep waveform outputs 86 and 88 via lines 90 and 92, respectively, to vertical deflection voltage or current generators 94 and 96.

The outputs of the vertical deflection generators 94 and 96 on lines 16 and 28 to the camera 12 and the display means 24 are, of course, in stairstep form 98, 100 corresponding to the outputs of the waveform generators 54, 56.

Figure 2:
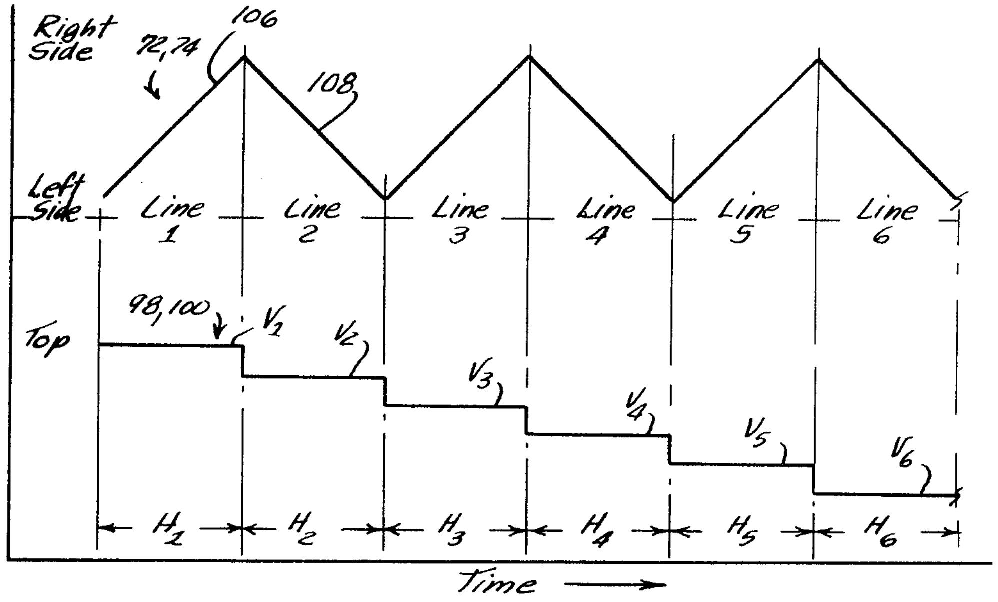
FIG. 2 is graphical presentation of horizontal and vertical deflection voltages.
Figure 3:
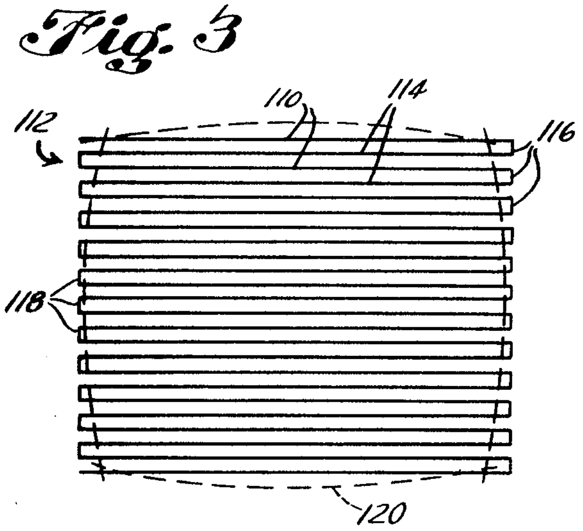
FIG. 3 is an illustration of the raster pattern achieved by this invention.

Referring to FIG. 2 in which it is assumed for example that the camera 12 and display means 24 utilize electrostatic (voltage) deflection, the time relationships between the horizontal triangular waveform deflection voltages 72, 74 and the stairstep vertical deflection voltages 98, 100 are shown. Thus, during a first time period $H_1$, the horizontal deflection voltage increases linearly as shown at 106 while the vertical deflection voltage is at a constant level $V_1$. Accordingly a first left to right horizontal scan line 110 is drawn in the display raster 112 of FIG. 3. At the end of the period $H_1$, the vertical deflection voltages step to a second level $V_2$ which is held for the next period $H_2$ while the horizontal deflection voltages decrease linearly as shown at 108. Accordingly, a first right to left horizontal scan line 114 is drawn in the display raster 112. This process is repeated during periods $H_3$, $H_4$, etc. to produce a field of horizontal, vertically spaced, alternating direction raster lines 110, 114. The vertical voltage steps between the levels $V_1$, $V_2$, $V_3$, etc. produce vertical traces 116, 118 at right and left edges of the raster 112. These however need not be blanked, as the retrace lines of a conventional raster must be, because they do not traverse the display. In addition, it is common practice to mask the outer edges of television display as is indicated by the dotted line 120 in FIG. 3, and the vertical step traces 116, 118 will normally be masked thereby.

Figure 4:
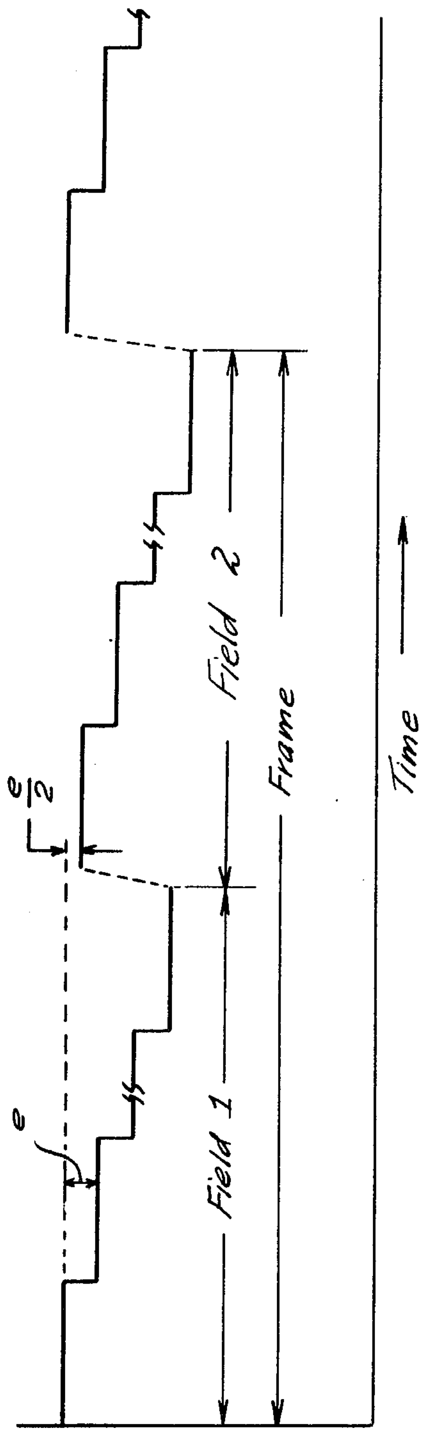
FIG. 4 is a graphical illustration of stairstep waveforms for effecting an interlace scan.

On alternate fields, two fields constituting a frame, the stairstep vertical deflection outputs 98 and 100 are displaced vertically by one half of the vertical step in order to produce a two-to-one interlace raster. This is illustrated in FIG. 4, wherein the vertical deflection drive outputs 98, 100 comprise levels which are vertically spaced by an amount *e* within each field, and are displaced vertically by an amount of *e*/2 in one field of a given frame with respect to the succeeding field of that frame. Of course other interlace ratios such as three-to-one may be used, in which case the vertical displacement for succeeding fields within a frame would be *e*/3.

All of the circuit elements in the described combination except the triangular waveform generators 46, 48 and the stairstep waveform generators 54, 56 are well known to those skilled in the arts pertaining to television. The triangular and stairstep waveform generators are not commonly used in television circuitry and accordingly they will be described in more detail.

Figure 5:
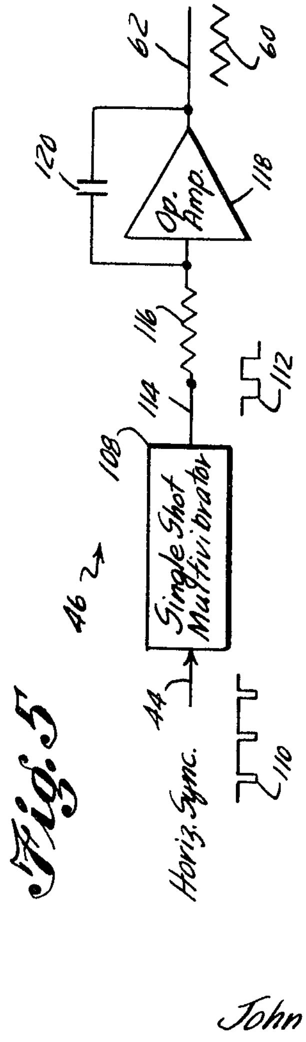
FIG. 5 is a diagrammatic illustration of a triangular waveform generator forming part of the system of FIG. 1.

Referring to FIG. 5, the triangular waveform generator 46 comprises a single-shot multivibrator 108 which receives horizontal sync pulses or signals 110 via line 44. The multivibrator 108 provides a symmetrical square wave output 112 on line 114. The square wave output 112 of the multivibrator 108 is applied through a resistor 116 to an operational amplifier 118 bridged by a capacitor 120. The resistor 116, operational amplifier 118, and capacitor 120 serve as a Miller integrator which converts the symmetrical square wave 112 to the desired symmetrical triangular waveform 60 on line 62. The triangular waveform generator 48 can be identical to the just described generator 46.

Figure 6:
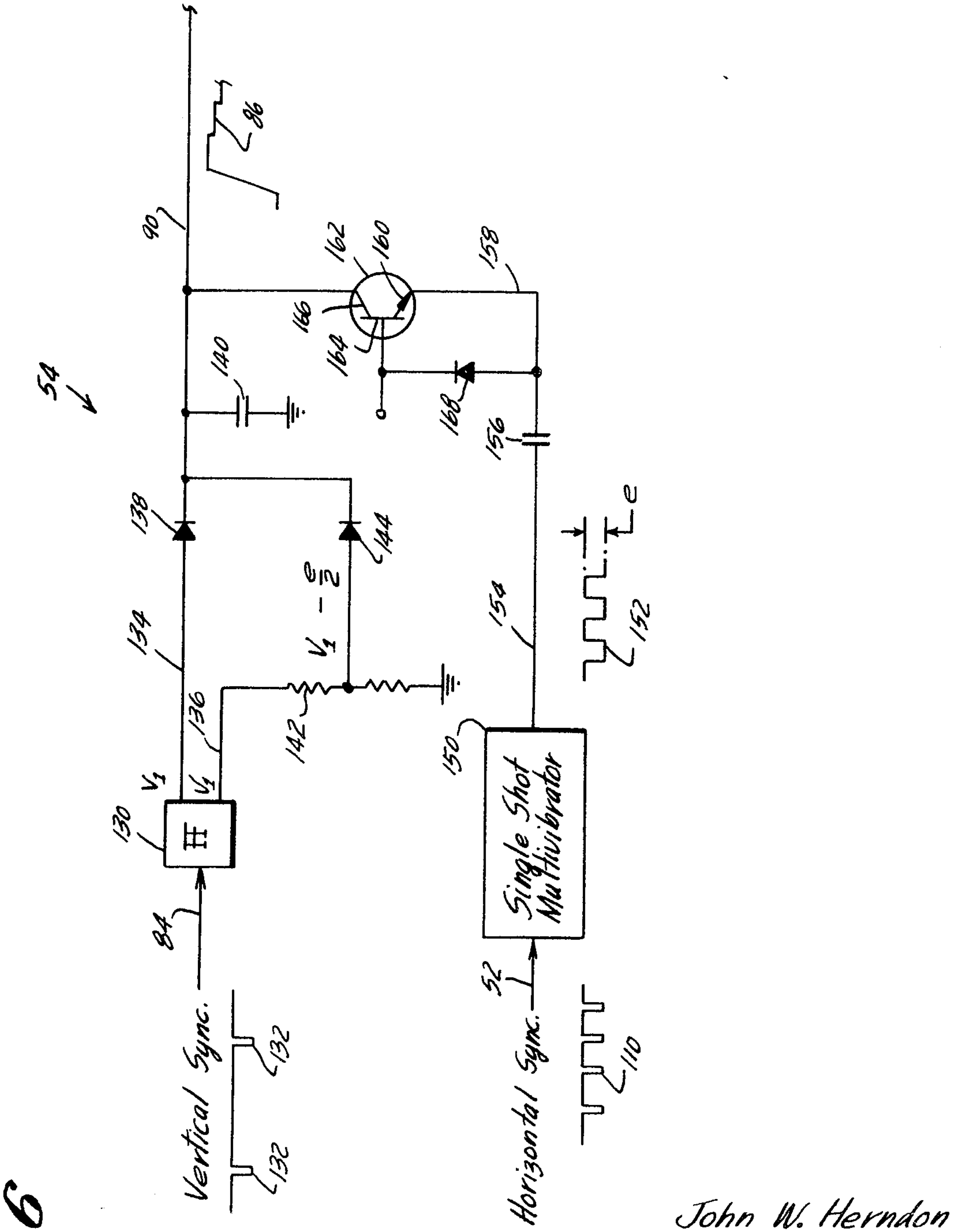
FIG. 6 is a diagrammatic illustration of a stairstep waveform generator forming part of the system of FIG. 1.

Referring to FIG. 6, the stairstep waveform generator 54 comprises a flip-flop 130 which receives vertical sync signals 132 via line 84 and provides alternative outputs on lines 134, 136 in response thereto. That is to say, when a first signal 132 is received the flip-flop 130 will provide a voltage pulse of $V_1$ on line 134, when the next signal 132 is received the flip-flop will provide a similar voltage pulse of $V_1$ on line 136, and when the next signal 132 is received the flip-flop will again provide a voltage pulse of $V_1$ on line 134, and so on. Line 134 is connected via a diode 138 and line 90 to one side of a capacitor 140, the other side of which is grounded. The line 136 is connected via a voltage divider 142, a diode 144, and line 90 to the capacitor 140.

The generator 54 further comprises a single shot multivibrator 150 which receives horizontal sync signals 110 via line 52 and provides a symmetrical square wave output 152 of voltage *e* on line 154. The output on line 154 is coupled via a capacitor 156 and line 158 to the emitter 160 of a transistor 162 having also a base 164 and collector 166. The emitter 160 and the base 164 are connected by a diode 168, and the base is provided with a suitable bias voltage so that the transistor is normally non-conductive but is rendered conductive by each occurrence of a square wave 152.

The occurrence of a voltage pulse on line 134 serves to charge the capacitor 140 almost instantaneously to the voltage level $V_1$ (FIG. 2) where it will stay for the period $H_1$. At the end of the period $H_1$ the capacitor 156 is charged to voltage *e* by square wave 152 which renders the transistor 162 conductive and the capacitor 140 is discharged by the amount *e* to voltage level $V_2$. The capacitor 140 stays at level $V_2$ during the period $H_2$ until the next increment of wave 152 activates transistor 162 and the charge on capacitor 140 is lowered again by voltage *e* to $V_3$, and so on until the next vertical sync signal 132 activates the flip-flop 130. At that time, a pulse of voltage $V_1$ appears on line 136 and is reduced by the voltage divider 142 to a voltage level $V_1 - e/2$ to which level the capacitor 140 becomes charged. The second field of the frame is thereby initiated (see FIG. 4) at a voltage which will effect the desired interlace. As before, the capacitor 140 is discharged in increments of voltage *e* throughout the field.

The next vertical sync signal will cause the flip-flop to change state again and return the capacitor 140 to the voltage level $V_1$ for the next field.

From the foregoing detailed description of a preferred embodiment of the invention, it will be recognized that the previously stated objects and advantages are achieved thereby. Particularly it will be appreciated that the resulting bidirectional scan reduces the amount of time lost in retrace or moving the scanning beam to the beginning of its next active trace.

Obviously many modifications and variations of the present invention are possible in the light of the above teachings. It is therefore to be understood that within the scope of the appended claims the invention may be practiced otherwise than as specifically described.

What is claimed is:

1. In a television system, bidirectional horizontal scan circuitry comprising:
- a master sync signal generator;
- a vertical sync signal generator responsive to master sync signals to provide vertical sync signals;
- a horizontal sync signal generator responsive to master sync signals to provide horizontal sync signals;
- triangular waveform generator means responsive to the output of said horizontal sync signal generator and providing a symmetrical triangular waveform output for application to horizontal deflection means;
- stairstep waveform generator means responsive to the outputs of said vertical and horizontal sync signal generators and providing a stairstep vertical deflection signal for application to vertical deflection means comprising: a first capacitor; a flip-flop responsive to said vertical sync signal to alternately provide first and second outputs each of voltage $V_1$; first diode means connecting said first output to charge said first capacitor; voltage divider means connected to receive said second output and operative to provide a reduced voltage of $V_1 - e/2$; second diode means connecting said reduced output to charge said first capacitor; a second capacitor; normally non-conductive transistor means connected between said capacitors; and second means responsive to said horizontal sync signals to provide a square wave of a predetermined voltage *e* to said second capacitor, whereby said transistor is periodically rendered conductive and said charge on said first capacitor is reduced with each conductive period by the voltage increment *e*;

whereby scansion is characterized by horizontal, parallel sweeps in alternate directions, with a vertical step at the end of each sweep.

* * * * *